(12) United States Patent
Marolia et al.

(10) Patent No.: US 12,112,204 B2
(45) Date of Patent: *Oct. 8, 2024

(54) MODULAR ACCELERATOR FUNCTION UNIT (AFU) DESIGN, DISCOVERY, AND REUSE

(71) Applicant: Intel Corporation, Santa Clara, CA (US)

(72) Inventors: Pratik M. Marolia, Hillsboro, OR (US); Aaron J. Grier, Hillsboro, OR (US); Henry M. Mitchel, Wayne, NJ (US); Joseph Grecco, Saddle Brook, NJ (US); Michael C. Adler, Newton, MA (US); Utkarsh Y. Kakaiya, Folsom, CA (US); Joshua D. Fender, East York (CA); Sundar Nadathur, Cupertino, CA (US); Nagabhushan Chitlur, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,244

(22) Filed: Aug. 9, 2022

(65) Prior Publication Data

US 2023/0070995 A1    Mar. 9, 2023

Related U.S. Application Data

(63) Continuation of application No. 16/619,442, filed as application No. PCT/US2017/039880 on Jun. 29, 2017, now Pat. No. 11,416,300.

(51) Int. Cl.
*G06F 9/50* (2006.01)
*G06F 9/46* (2006.01)
*G06F 9/48* (2006.01)

(52) U.S. Cl.
CPC ............ *G06F 9/5027* (2013.01); *G06F 9/468* (2013.01); *G06F 9/4843* (2013.01); *G06F 9/5044* (2013.01)

(58) Field of Classification Search
None
See application file for complete search history.

(56) References Cited

U.S. PATENT DOCUMENTS

| 5,548,737 | A | 8/1996 | Edrington et al. |
| 7,676,661 | B1 * | 3/2010 | Mohan ................ G06F 9/30003 712/15 |

(Continued)

FOREIGN PATENT DOCUMENTS

| CN | 110678846 A | 1/2020 |
| CN | 111400051 A | 7/2020 |

(Continued)

OTHER PUBLICATIONS

'Using Shared Library Interposing for Transparent Application Acceleration in Systems with Heterogeneous Hardware Accelerators' by Tobias Beisel et al., Proc. Int. Conf. on Application-Specic Systems, Architectures, and Processors (ASAP), copyright IEEE 2010. (Year: 2010).*

(Continued)

*Primary Examiner* — Steven G Snyder
(74) *Attorney, Agent, or Firm* — NICHOLSON DE VOS WEBSTER & ELLIOTT LLP

(57) ABSTRACT

A system comprising an accelerator circuit comprising an accelerator function unit to implement a first function, and one or more device feature header (DFH) circuits to provide attributes associated with the accelerator function unit, and a processor to retrieve the attributes of the accelerator function unit by traversing a device feature list (DFL) referencing the one or more DFH circuits, execute, based on the attributes, an application encoding the first function to (Continued)

cause the accelerator function unit to perform the first function.

6 Claims, 12 Drawing Sheets

(56) References Cited

U.S. PATENT DOCUMENTS

| | | | | |
|---|---|---|---|---|
| 8,015,530 | B1* | 9/2011 | Sinclair | G06F 30/34 |
| | | | | 716/113 |
| 8,788,787 | B2 | 7/2014 | Mott et al. | |
| 9,142,004 | B2 | 9/2015 | Abiezzi et al. | |
| 9,298,490 | B2 | 3/2016 | Abiezzi et al. | |
| 9,311,106 | B1* | 4/2016 | Jones | G06F 9/4403 |
| 9,417,929 | B2 | 8/2016 | Fonseca et al. | |
| 9,916,636 | B2 | 3/2018 | Li et al. | |
| 10,866,842 | B2* | 12/2020 | Mamaghani | G06F 9/546 |
| 11,416,300 | B2* | 8/2022 | Marolia | G06F 9/5027 |
| 2011/0083131 | A1 | 4/2011 | Pirzada et al. | |
| 2012/0069032 | A1 | 3/2012 | Hansson et al. | |
| 2014/0007098 | A1 | 1/2014 | Stillwell et al. | |
| 2014/0143375 | A1 | 5/2014 | Walker et al. | |
| 2014/0176583 | A1* | 6/2014 | Abiezzi | G06F 9/5044 |
| | | | | 345/522 |
| 2014/0181806 | A1 | 6/2014 | Abiezzi et al. | |
| 2014/0181807 | A1 | 6/2014 | Fonseca et al. | |
| 2015/0317274 | A1 | 11/2015 | Arroyo et al. | |
| 2016/0036883 | A1 | 2/2016 | Vitthaladevuni et al. | |
| 2017/0293994 | A1 | 10/2017 | Li et al. | |
| 2019/0042329 | A1 | 2/2019 | Kakaiya et al. | |
| 2019/0138361 | A1 | 5/2019 | Bernat et al. | |
| 2020/0174838 | A1 | 6/2020 | Li et al. | |
| 2020/0174899 | A1 | 6/2020 | Ramasamy et al. | |
| 2022/0414053 | A1* | 12/2022 | Parra | G06F 9/30036 |

FOREIGN PATENT DOCUMENTS

| | | |
|---|---|---|
| CN | 111767146 A | 10/2020 |
| WO | 2014/100558 A1 | 6/2014 |
| WO | 2017/066936 A1 | 4/2017 |

OTHER PUBLICATIONS

International Preliminary Report on Patentability, PCT App. No. PCT/US2017/039880, Jan. 9, 2020, 12 pages.
International Search Report and Written Opinion, PCT App. No. PCT/US2017/039880, Mar. 29, 2018, 13 pages.
Non-Final Office Action, U.S. Appl. No. 16/619,442, Nov. 5, 2021, 17 pages.
Notice of Allowance, U.S. Appl. No. 16/619,442, Apr. 20, 2022, 10 pages.
Tutorialspoint, "Data Structure & Algorithms Tutorial", Available Online at <https://web.archive.org/web/20160618035230/http://www.tutorialspoint.com/data_structures_algorithms/index.html>, archived in Jun. 2016, Retrieved on Oct. 29, 2021, 10 pages.

* cited by examiner

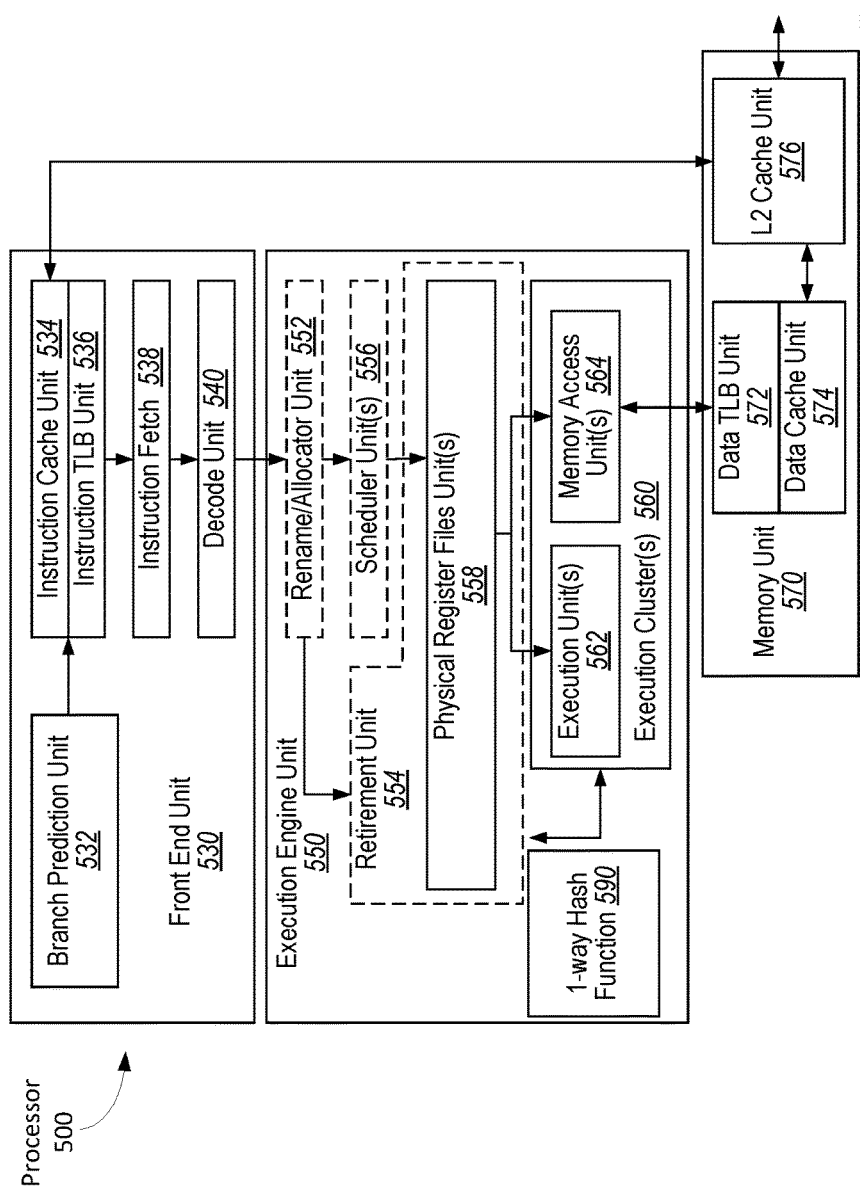
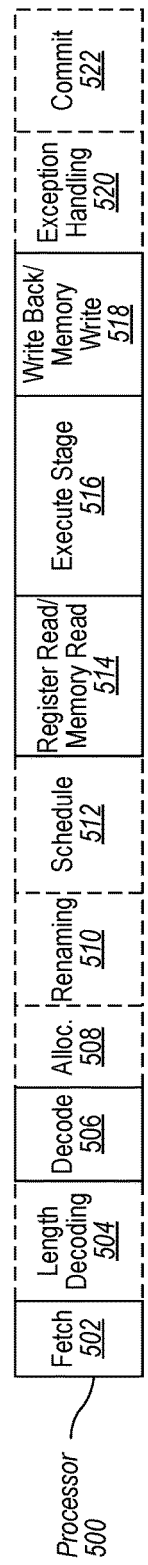
Figure 5A
Figure 5B

MODULAR ACCELERATOR FUNCTION UNIT (AFU) DESIGN, DISCOVERY, AND REUSE

TECHNICAL FIELD

The present disclosure relates to a system including a processor and accelerator circuits and, more specifically, to accelerator circuits including accelerator function units (AFUs) specified by a device feature list (DFL).

BACKGROUND

General-purpose processors (e.g., central processing units (CPUs)) may work cooperatively with accelerator circuits. The accelerators circuit may perform, on behalf of the general-purpose processors, certain tasks that require a large amount of processing cycles of the general-purpose processors, thus offloading the general-purpose processor and helping improve the efficiencies of the general-purpose processors. The accelerator circuits can be field-programmable gated arrays (FPGAs), application-specific integrated circuits (ASICs), or circuits composed of small processing cores (e.g., general-purpose computing on graphics processing units (GPGPUs)).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5A is a block diagram illustrating a micro-architecture for a processor including heterogeneous core in which one embodiment of the disclosure may be used.

FIG. 5B is a block diagram illustrating an in-order pipeline and a register renaming stage, out-of-order issue/execution pipeline implemented according to at least one embodiment of the disclosure.

DETAILED DESCRIPTION

An accelerator circuit may include accelerator function units (AFUs), where each AFU may include logic circuits that may be specified by a set of device feature parameters to perform a certain function delegated by a processor. Each AFU may include one or more logic circuit components that can be specified using different device feature parameters. For example, a FPGA may include vendor-supplied AFUs for performing computation-intensive tasks such as, for example, video compression. These vendor-supplied AFUs may be specified by a set of device feature parameters including features describing resources (e.g., memory-mapped input/output (MMIO) regions, interrupts, page table entries etc.). In some implementations, software applications running on a processor may discover these device feature parameters using system calls (e.g., driver calls or firmware calls) in the kernel space. In some implementations, these device feature parameters associated with AFUs are stored as part of driver/firmware programs, or as a data structure in the form of a data file stored in a storage device. The data structure is an intermediate data object between the AFUs and the software applications and is not modular with respect to the AFUs in the sense that the data structure needs to be updated for any hardware changes.

Embodiments of the present disclosure include modular accelerator circuits where the device feature parameters of AFUs are embedded in the hardware components (referred to as device feature header (DFHs) circuits). Each of these DFH circuits may include one or more pointer fields to store references pointing to other DFH circuits. Thus, these related DFH circuits may form a hardware structure (referred to as a device feature list (DFL) hereinafter) during the design of the accelerator circuits. Thus, software applications (including those in the kernel space (referred to as system software) and applications in the user space (referred to as user applications)) can make a system call to start traversing the DFL to discover the device feature parameters stored in the DFH circuits. Embodiments of the present disclosure may thus bypass the intermediate data structure and allow a direct discovery of device feature parameters from the DFH circuits in the DFL. The DFH circuits of the embodiments have the flexibility to specify device feature parameters associated with a specific AFU or device feature parameters associated with a re-usable library component (referred to as a basic building block (BBB)). The BBB may be a combination of hardware components (e.g., as a hardware feature of an AFU) and software application programming interfaces to a library. A library may include one or more components corresponding to BBBs that can be re-used by different accelerator circuits, thus creating hardware components that can be re-used in different applications.

Figure 1:
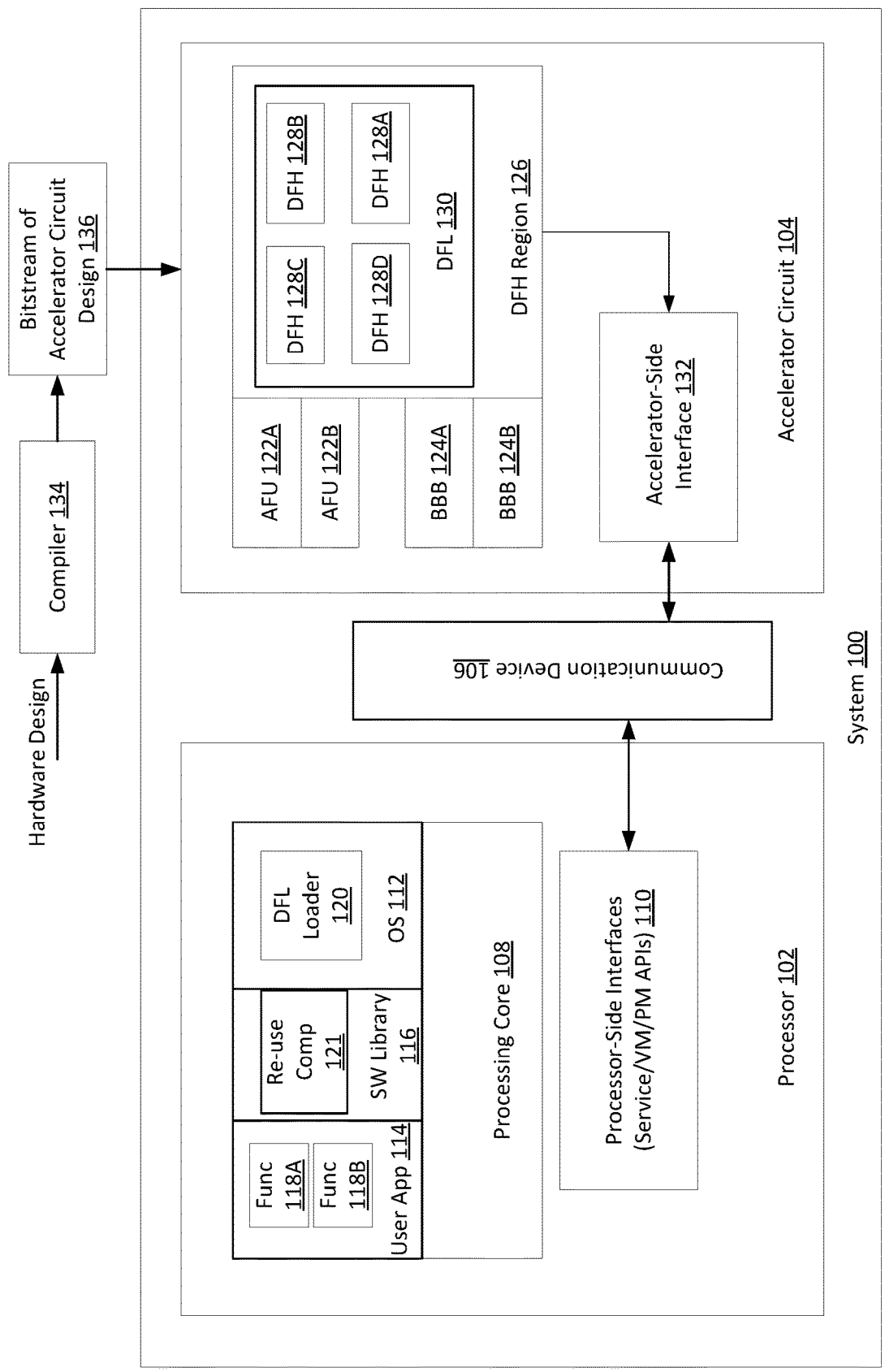
FIG. 1 is a system according to an embodiment of the present disclosure.

FIG. 1 is a system 100 according to an embodiment of the present disclosure. System 100 may include a processor 102 and an accelerator circuit 104 that are interconnected through a communication device 106.

Processor 102 may be a hardware processor such as a central processing unit (CPU) that includes one or more processing cores (not shown) that may be configured to execute system software and user application software. Accelerator circuit 104 can be field-programmable gated arrays (FPGAs), application-specific integrated circuits (ASICs), or circuits composed of small processing cores (e.g., general-purpose computing on graphics processing units (GPGPUs)). Communication device 106 may connect processor 102 and accelerator circuit 104 so that they can work cooperatively to perform a complex task. In one embodiment, system 100 can be a system-on-a-chip (SoC) where processor 102 and accelerator circuit 104 are connected by an interconnect circuit. In another embodiment, system 100 may include processor 102 and accelerator circuit 104 that are connected by a network (e.g., an Ethernet or the Internet).

Processor 102 may further include processing cores 108 to execute software applications. Each one of the software applications during execution may be associated with a privilege level (e.g., ring 0-3 in the ring system, referred to as the supervisor level), where the highest privilege level (e.g., ring 0) is commonly assigned to components of the kernel, and the memory space associated with the kernel is referred to as the kernel space. The lowest privilege level (e.g., ring 3, referred to as the user level) is commonly assigned to user applications, and the memory space associated with the user applications is referred to as the user space. During the operation of processor 102, processes of software applications with higher privilege levels may access the memory space of the lower privilege levels.

Processor 102 may further include processor-side interfaces 110 for software applications running on processing core 108 to interact with hardware components associated with processor 102. Processor-side interface 110 may include a service interface that may expose certain device features of the processor 102 to software applications running processing core 108, a virtual memory interface for interacting with the virtual memory space associated with processing core 108, and a physical memory interface for interacting with the physical memory space associated with processing core 108.

In one embodiment, processing core 108 may execute software applications including an operating system 112 and a user application 114. User application 114 may be associated with a user space with a lower privilege level (e.g., ring 3). User application 114 may solve a complex computational problem that may rely on accelerator circuit 104 to perform certain functions 118A, 118B of user application 114. Accelerator circuit 104 may include accelerator function units 112A and 112B implemented to perform the corresponding functions 118A and 118B.

Further, user application 114 may employ certain re-usable component 121. Re-usable component 121 may be code that can be used by different user applications. In one embodiment, re-usable component 121 may be a library function in a software library 116. In another embodiment, re-usable component 121 may be a code segment that discovers and/or operates a basic building block (BBB) 124A, 124B in accelerator circuit 104. Thus, one or more BBBs 124A, 124B may be used by more than one accelerator function units 122A, 122B.

In one embodiment, accelerator function units 122A, 122B, and BBBs 124A, 124B may be derived from a hardware design by a vendor as explained in the following example. For example, accelerator circuit 104 may be provided by a FPGA circuit. A vendor may supply the hardware design specified in a hardware description language (e.g., the VHSIC hardware description language (VHDL)). A computer system may run a compiler 134 to generate a bitstream 136. The bitstream 136 may be executed to program the FPGA to generate accelerator function units 122A, 122B, and BBBs 124A, 124B. In one embodiment, accelerator function units 122A, 122B and BBBs 124A, 124B may be generated together based on a single bitstream 136. In another embodiment, one or more BBBs may be generated from a different bitstream other than the bitstream 136 that is used to generate accelerator function units 122A, 122B.

Each one of accelerator function units 122A, 122B, and BBBs 124A, 124B may be expressed by certain device feature parameters. These device feature parameters may be assigned to accelerator function units 122A, 122B, and BBBs 124A, 124B when the accelerator function units and BBBs are generated according to bitstreams (e.g., bitstream 136). Applications (e.g., user application 114 or system applications such as, for example, operating system 112) may need to discover these device feature parameters before they can invoke accelerator function units 122A, 122B (employed to perform functions 118A, 118B), and BBBs 124A, 124B. In some implementations, these device feature parameters are discovered by system calls (e.g., driver calls and firmware calls) enumerating each one of the accelerator function units and BBBs and are stored in a software data structure.

Instead of using a software data structure to store these device feature parameters, accelerator circuit 104 of the present disclosure may include a device feature header (DFH) region 126 that includes device feature header (DFH) circuits 128A-128D to store device feature parameters. In one embodiment, DFH region 126 may include an array of control and status registers (CSRs) configured to provide device feature headers. In other embodiments, DFH region 126 may be mapped to a memory-mapped input/output (MMIO) circuit region, or mapped to the Peripheral Component Interconnect Express (PCIe) configuration space, or mapped to a network interface (e.g., an Ethernet interface), or mapped to a shared memory region accessible by processor 102 and accelerator circuit 104. DFH regions 126 (and the DFH circuits 128A-128D) may be exposed to software applications (e.g., user applications 114 and OS 112) through accelerator-side interface 132, communication device 106, and processor-side interfaces 110.

DFH circuits 128A-128D may be generated concurrently with accelerator function units 122A-122B based on the bitstream 136. Each one of DFH circuits 128A-128D may include parameter fields to store hardware features associated with accelerator function units 122A-122B, and a pointer field to store a reference to other DFH circuits in DFH region 120. Thus, DFH circuits 128A-128D are related with each other through the references stored in the pointer fields to form a device feature list (DFL) 130.

DFH circuits 128A-128D may be organized in different forms of relations. In one embodiment, DFL 130 may be a linked list of DFH circuits 128A-128D, where the header of the DFL 130 may start from a pre-determined location known to a DFL loader 120 of a system software application (e.g., operating system 112) or a user application. Thus, software applications such as, for example, a DFL loader 120 as a component of operating system 112 may start, from the pre-determined location, to load device feature parameters by traversing DFL 130. This allows different vendors to supply accelerator function units in a modular fashion and eliminate the need for an intermediate data structure to store device feature parameters.

Figure 2:
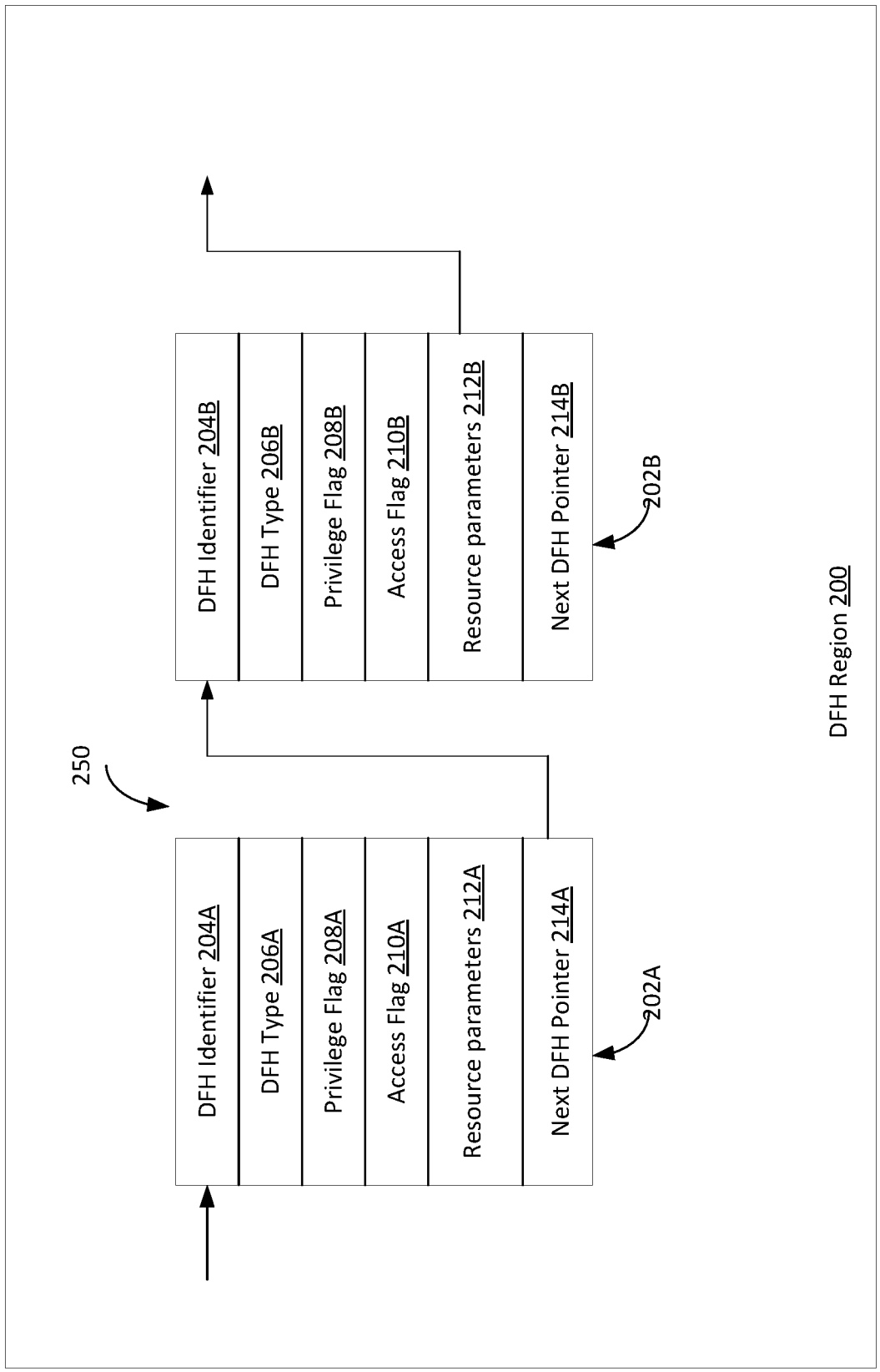
FIG. 2 illustrates a DFH region according to an embodiment of the present disclosure.

FIG. 2 illustrates a DFH region 200 including a DFL 250 according to an embodiment of the present disclosure. As shown in FIG. 2, DFL 250 may contain DFH circuits 202A, 202B. Each of DFH circuits 202A, 202B may store parameter fields 204A-212A, 204B-212B. Each of DFH circuits 202A, 202B may further store a pointer field 214A, 214B that points to a next DFH circuit on the DFL 250. Each of DFH circuits 202A, 202B may specify a particular device feature associated with accelerator function unit 122A, 122B, or BBBs 124A, 124B.

Each of DFH circuits 202A, 202B may include a DFH identifier field 204A, 204B for storing identity information of the DFH circuit. In one embodiment, the identity information is a global unique identifier (GUID) that may uniquely associate a device feature (such as, for example, accelerator function unit 122A, 122B or BBBs 124A, 124B) with specific software components (e.g., a driver in the kernel space, or dynamically linked library (.DLL) or shared library (.so) components in the user space). The identity information may also link the device feature to a vendor that provides the device feature. Each of DFH circuits 202A, 202B may further include a DFH type field 206A, 206B for storing the type of the device feature. The type can be "accelerator function unit," "basic building block," or "private feature." The private feature is a type of sub-function defined within an accelerator function unit. The private feature sub-functions cannot be shared by other accelerator function units. In one embodiment, the type may be defined, as a sub-field, of DFH identifier field 204A, 204B.

Each of DFH circuits 202A, 202B may further include a privilege flag field 208A, 208B for storing the privilege level of the software applications that can use the device feature. The privilege level can be a supervisor level (e.g., associated with ring 0-2) and a user level (e.g., associated with ring 3). Privileged device feature parameters typically cannot be exported or mapped to user-level software applications. Each of DFH circuits 202A, 202B may further include an access flag field 210A, 210B for storing an access right to the device feature. The access right can be exclusive or shared. The access right denotes whether a given MMIO region or memory region (e.g., specified in the resource parameter field 212A, 212B) should be exclusively used by a process or can be shared among different processes.

Each of DFH circuits 202A, 202B may further optionally include a resource parameter field 212A, 212B for storing resource information. The resource information may include, but not limited to, at least one of an MMIO region offset and optional the length of the MMIO region, an interrupt identifier, page table entries, memory regions, or command queues.

Each of DFH circuits 202A, 202B may further include a next DFH pointer field 214A, 214B for storing a reference to the next DFH circuit on DFL 250. The reference to the next DFH field can be, but not limited to, an absolute pointer to the next DFH circuit, a relative offset to the next DFH circuit, a pre-determined stride, or a reference to a register that stores the length.

In other embodiments, DFH circuits 128A-128D may be organized as a DFL of a tree structure or a graph structure (or any organized structures) with DFH circuits 128A-128D as the nodes of the tree or graph. For example, as to the DFL 130 organized in the form of a tree structure, each DFH circuits 128A-128D may include two pointer fields—a NextLeft field and a NextRight field—to store references to the related DFH circuit nodes on DFL 130 of a tree structure. A reference to the root node of the DFL 130 may be stored in a pre-determined location. A software application may start to traverse DFL 130 from the pre-determined location. In another embodiment, DFH circuits 128A-128D may be organized as a tiered structure. A top-level DFH of DFL 130 may include two pointer fields—e.g., a NextA field and a NextB field, where the NextA field may store a reference to a first linked list of DFH circuits and the NextB field may store another reference to a second linked list of DFH circuits. Thus, the DFL 130 may be a linked list including subordinate linked lists. Thus, DFL 130 can be different types of relational structures of DFH circuits.

Referring to FIG. 1, operating system 112 may implement a DFL loader 120 to retrieve DFL 130. In one embodiment, the head of DFL 130 may be stored in a pre-determined location (e.g., a determined CSR) so that DFL loader 120 may start traversing DFL 130 from a known location. In one embodiment, DFL loader 120 may, during a device discovery process, query DFL 130 to discover device feature parameters associated with device feature such as, for example, accelerator function unit 122A, 122B, or BBBs 124A, 124B. Upon discovering these device feature parameters, operating system 112 may load or bind software components corresponding to the device feature parameters. This device discovery process can be triggered once when operating system 112 loads device drivers, or whenever there is an update in the hardware configuration. The trigger can be an interrupt signal generated by the hardware (e.g., accelerator circuit 104). The trigger can also be generated by the software application when the software application initiates the update of the hardware configuration.

In another embodiment, rather than retrieving all device feature parameters from DFL 130, DFL loader 120 may retrieve the parameters of a specific hardware feature. The parameters of the specific hardware feature may be identified based on the DFH identifier associated with a DFH circuit. This is useful in situations where a software application that is already running on processor 102 needs to discover sub-features. This type of situations may occur when a device is composed of multiple hardware sub-features (e.g., nested sub-features) where sub-features are discovered as they are needed.

In one embodiment, DFL 130 can be employed to store platform-level feature parameters associated with accelerator circuit 104. These platform-level feature parameters may be used to determine the existence of accelerator circuit 104 (including AFUs and BBBs). The platform-level features may include the type of DFH region 126 (e.g., AFU, BBB, or private features), identifier of DFH region 126 that can be used by DFL loader 120 to load and/or link to corresponding software components (e.g., .DLL, .SYS, .SO components), privilege level, access rights. In another embodiment, DFL 130 may be employed to store features (and sub-features) of a specific AFU. DFL loader 120 may discover these AFU-specific features using DFL 130 and load and/or link to corresponding software components.

Figure 3:
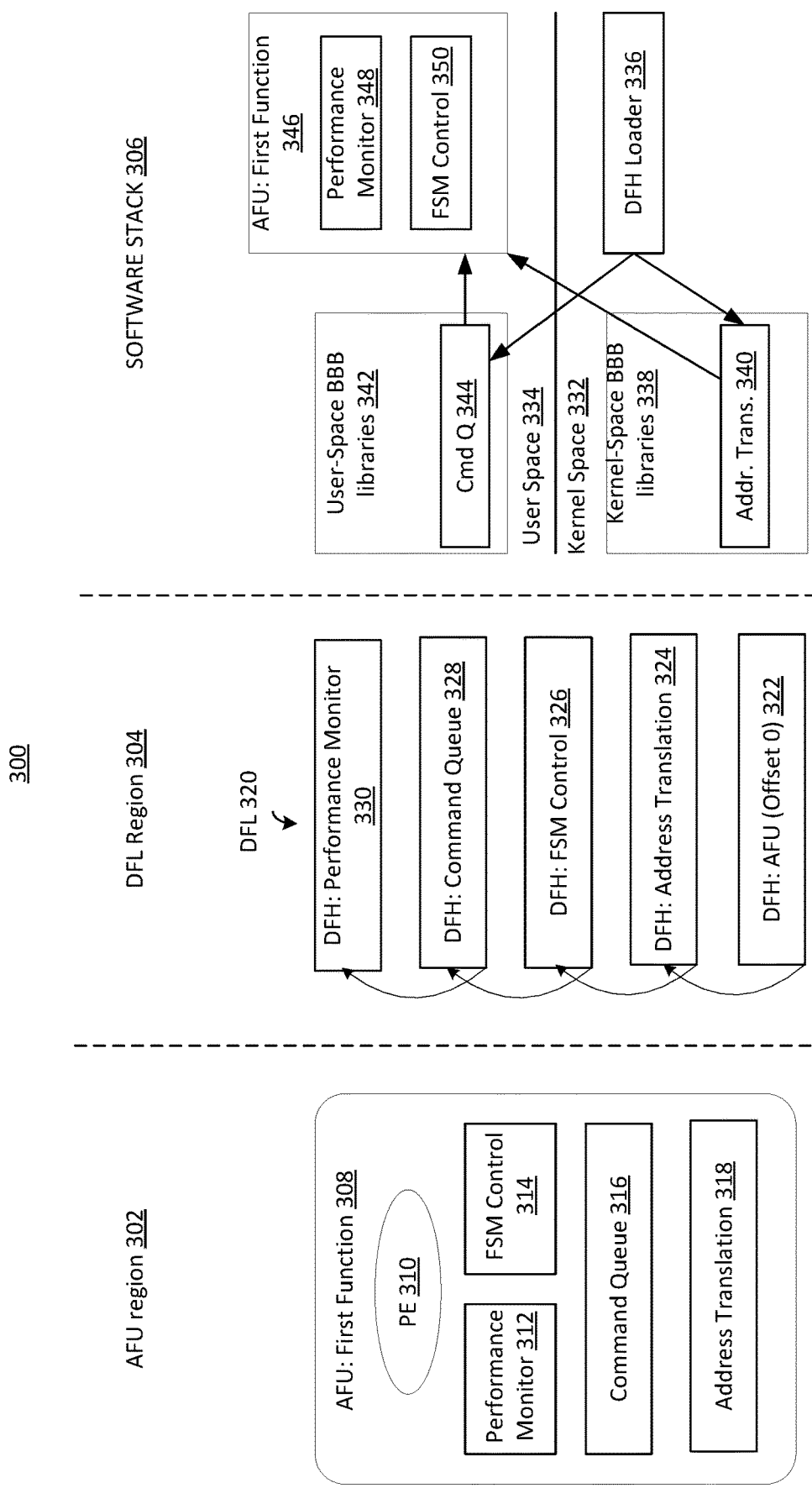
FIG. 3 illustrates a system including a combination of hardware and software components according to an embodiment of the present disclosure.

FIG. 3 illustrates a system 300 including a combination of hardware and software components according to an embodiment of the present disclosure. Referring to FIG. 3, system 300 may include an AFU region 302 including one or more AFUs and a DFL region 304 including the associated DFL 320. System 300 may also include a software stack 306 implementing software components that can employ the AFUs in AFU region 302 and DFL 304 to perform the complex calculations. AFU region 302 may include a first AFU 308 to perform a complex calculation such as, for example, a large matrix multiplication or inversion. First AFU 308 may include, for example, at least one of a processing engine circuit 310, a performance monitor circuit 312, a finite-state machine (FSM) control circuit 314, a command queue circuit 316, or an address translation circuit 318. First AFU 308 and its components (performance monitor circuit 312, finite-state machine (FSM) control circuit 314, command queue circuit 316, and address translation circuit 318) may be associated with a DFH circuits 322-330 of DFL 320 for storing the corresponding device feature parameters.

Processing engine circuit 310 may include the circuit logics (e.g., configurable logic blocks (CLBs) in a FPGA) that can be programmed to perform the complex calculation. In one embodiment, the processor executing a software application may employ a virtual memory address space that is larger than the physical memory address space to achieve high memory performance. In such situation, address translation circuit 318 may provide the virtual memory address (associated with first AFU 308) to physical memory address translation associated with a processor. A command queue is a sequence of work order submitted by a processor (e.g., processor 102 as shown in FIG. 1) to accelerator circuit (e.g., accelerator circuit 104 as shown in FIG. 1). A software application may write commands to the command queue, and command queue circuit 316 of first AFU 308 may retrieve the commands from the command queue.

Based on the commands retrieved from the command queue, FSM control circuit 314 may implement a finite state machine that controls the order of the execution of the retrieved commands on processing engine circuit 310. For example, FSM control circuit 314 may fetch data needed by processing engine circuit 310, initiate an operation performed by the processing engine circuit 310, write the result to a memory location, and start a next operation. Performance monitor circuit 312 may include circuit logics to record performance parameters and debugging parameters. In one embodiment, performance monitor circuit 312 may record the number of outstanding requests for calculation received by first AFU 308, the number of clock cycles during which processing engine circuit 310 is idle, the number of clock cycles for first AFU 308 to complete a command, the number of address translation hits and misses.

In one embodiment, address translation circuit 318 and command queue 316 may be re-used by different AFUs. Thus, address translation circuit 318 and command queue 316 may be implemented as basic building blocks that correspond to software components implemented as library functions. As shown in FIG. 3, address translation circuit 318 may correspond to address translation function 340 in kernel-space library 338, and command queue function 344 in user-space library 342. FSM control circuit 314 and performance monitor circuit 312 may be specific to first AFU and thus specified as device features of AFU 308. DFL 320 may include a linked list (or other types of relational structures) of DFHs to specify device features associated with first AFU 308. DFL 320 may include, as its head, an AFU DFH circuit 322 which can be referenced from a pre-determined location in DFL region 304 (e.g., a zero offset location). AFU DFH circuit 322 may include an identifier to identify the first AFU function, a type parameter (AFU, BBB, or private feature), a privilege level (supervisor or user), an access right (exclusive or shared), and a next pointer field pointing to a next address translation DFH circuit 324. AFU DFH circuit 322 may optionally include a resource field for storing a reference to resources (e.g., memory regions) that may be used by first AFU 308.

Address translation DFH circuit 324 may similarly include these fields with the type field specified as a BBB type and the next pointer field pointing to FSM control DFH circuit 326. FSM control DFH circuit 326 may similarly include these fields with the type field specified as an AFU type and the next pointer field pointing to command queue DFH circuit 328. Command queue DFH circuit 328 may similarly include these fields with the type field specified as the BBB type and the next pointer field pointing to performance monitor DFH circuit 330 which may include the type field specified as the AFU type and the next pointer field specified as null to indicate the end of DFL 320. In another embodiment, DFH circuit 328 may include a bit flag that, when set, indicates the end of the linked list.

DFH loader 336 as a component of an operating system when executed may start traversing DFL 320. DFH loader 336 may first read, from AFU DFH circuit 322, device feature parameters associated with first AFU 308. DFH loader 336 may retrieve an identifier stored in the identifier field of AFU DFH circuit 322 and may, based on the identifier, link first AFU 308 to a first function 346 in an application in user space 334. DFH loader 336 may further, based on the next pointer field of AFU DFH circuit 322, move to address translation DFH circuit 324 and link address translation DFH circuit 324 to address translation function 340 in kernel-space library 338. DFH loader 336 may next load parameters stored in FSM control DFH circuit 326 (associated with FSM control circuit 314) and link a FSM control component 350 of first function 346 in user space 334 to FSM control circuit 314. DFH loader 336 may next load parameters associated stored in command queue DFH circuit 328 (associated with command queue circuit 316) and link command queue 344 in user-space library 342 with command queue circuit 316. DFH loader 336 may next load parameters stored in performance monitor DFH circuit 330 (associated with performance monitor circuit 312) and link performance monitor component 348 of first function 346 with performance monitor circuit 312. A processor may then execute a user application including first function 346 which may already set up by DFH loader 336 to employ first AFU 308 to perform the requested complex calculation.

Figure 4:
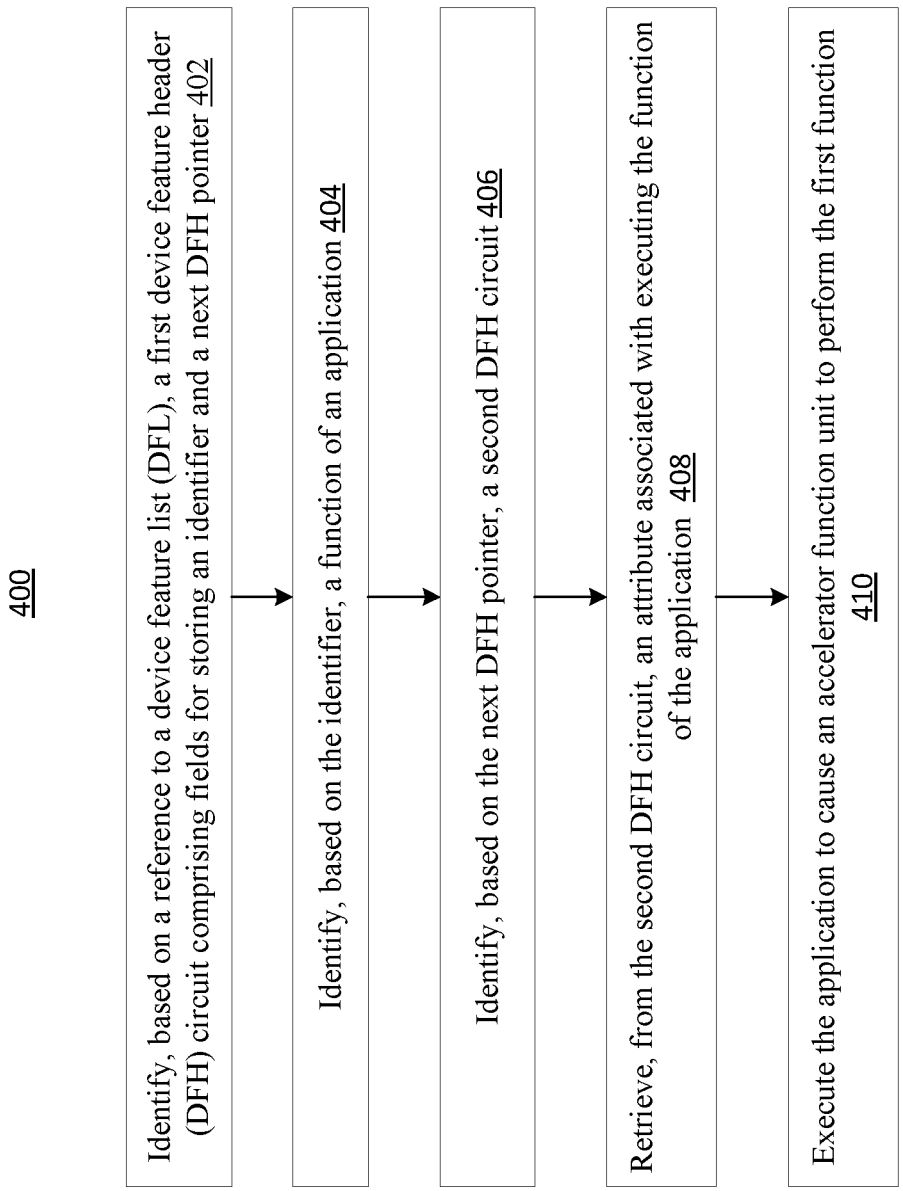
FIG. 4 is a block diagram of a method to load attributes of a function from a device feature list according to an embodiment of the present disclosure.

FIG. 4 is a block diagram of a method 400 to load attributes of a function from a device feature list according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of processor 102 including processing core 108 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, processor 102 including processing core 108 may execute DFL loader 120 implemented as a component of operating system 112.

At 402, processor 102 may identify, based on a reference to a device feature list (DFL), a first device feature header (DFH) circuit comprising fields for storing an identifier and a next DFH pointer.

At 404, the processor 102 may identify, based on the identifier, a function of an application.

At 406, the processor 102 may identify, based on the next DFH pointer, a second DFH circuit.

At 408, the processor 102 may retrieve, from the second DFH circuit, an attribute associated with executing the function of the application.

At 410, the processor 102 may execute the application to cause an accelerator function unit to perform the first function.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may be part of a multiprocessor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 104 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
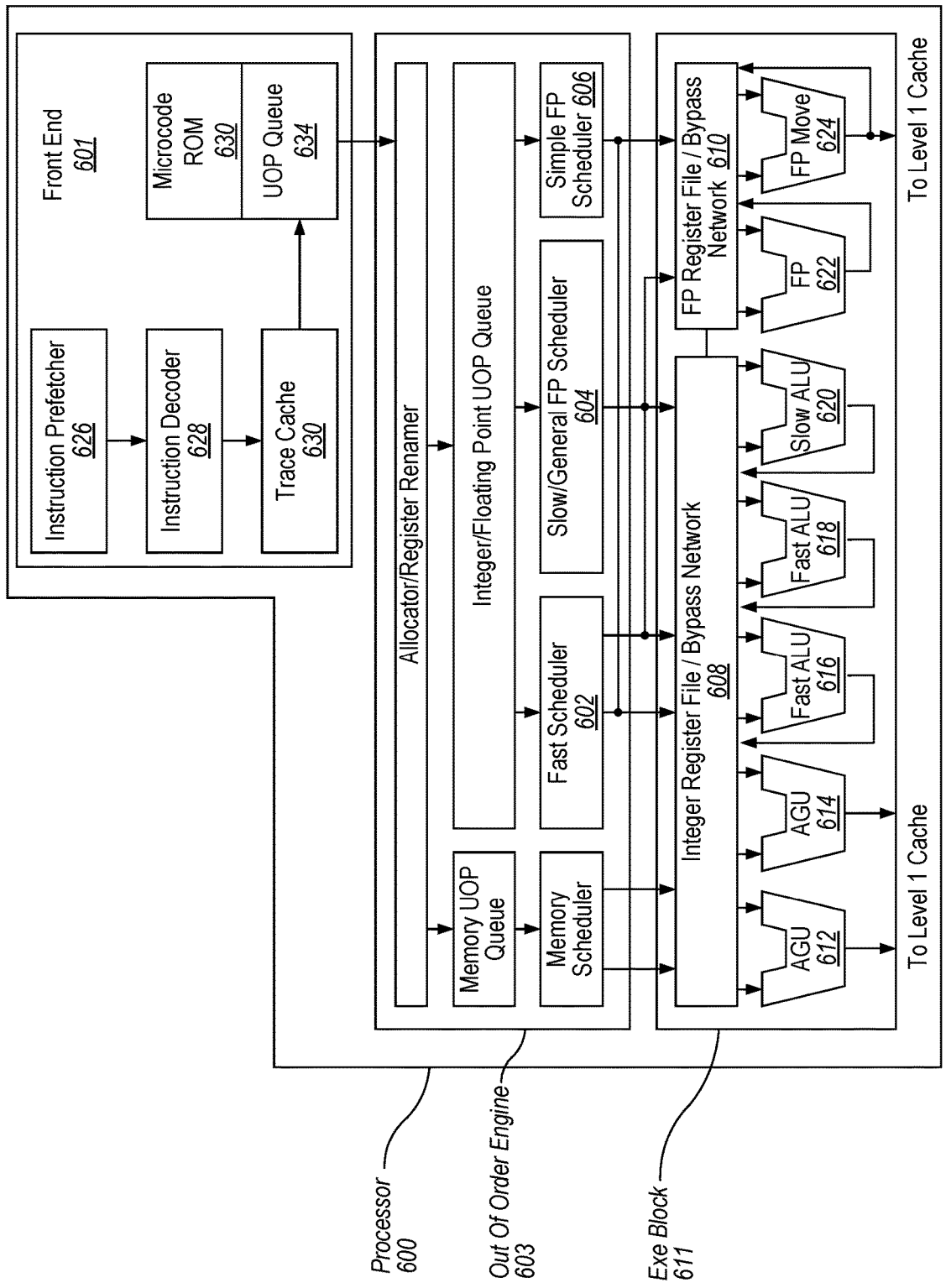
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "microinstructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the microinstructions need to execute. The processor 600 of one embodiment is comprised of a number of execution units: address generation unit (AGU)

612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, CA These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
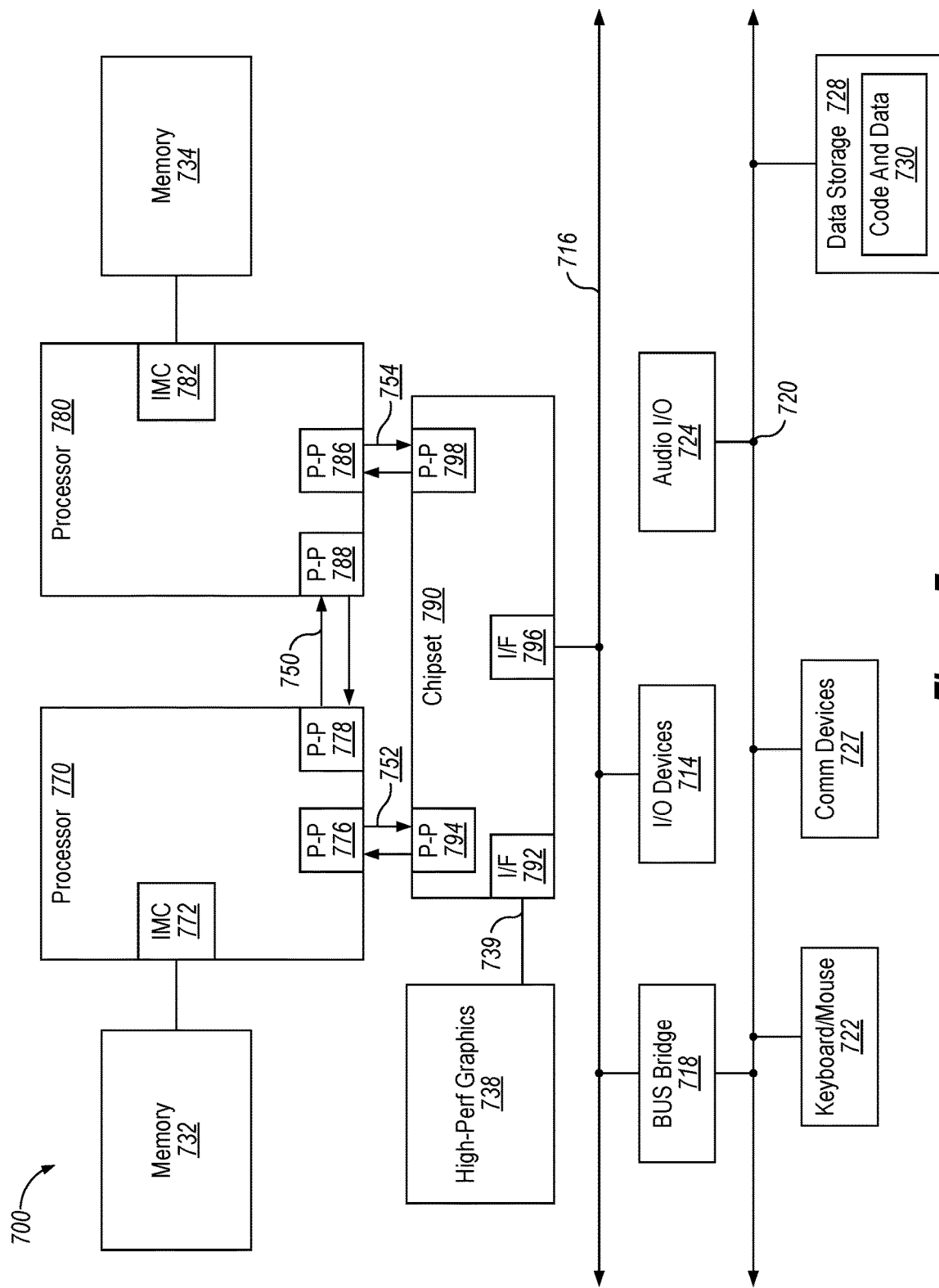
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
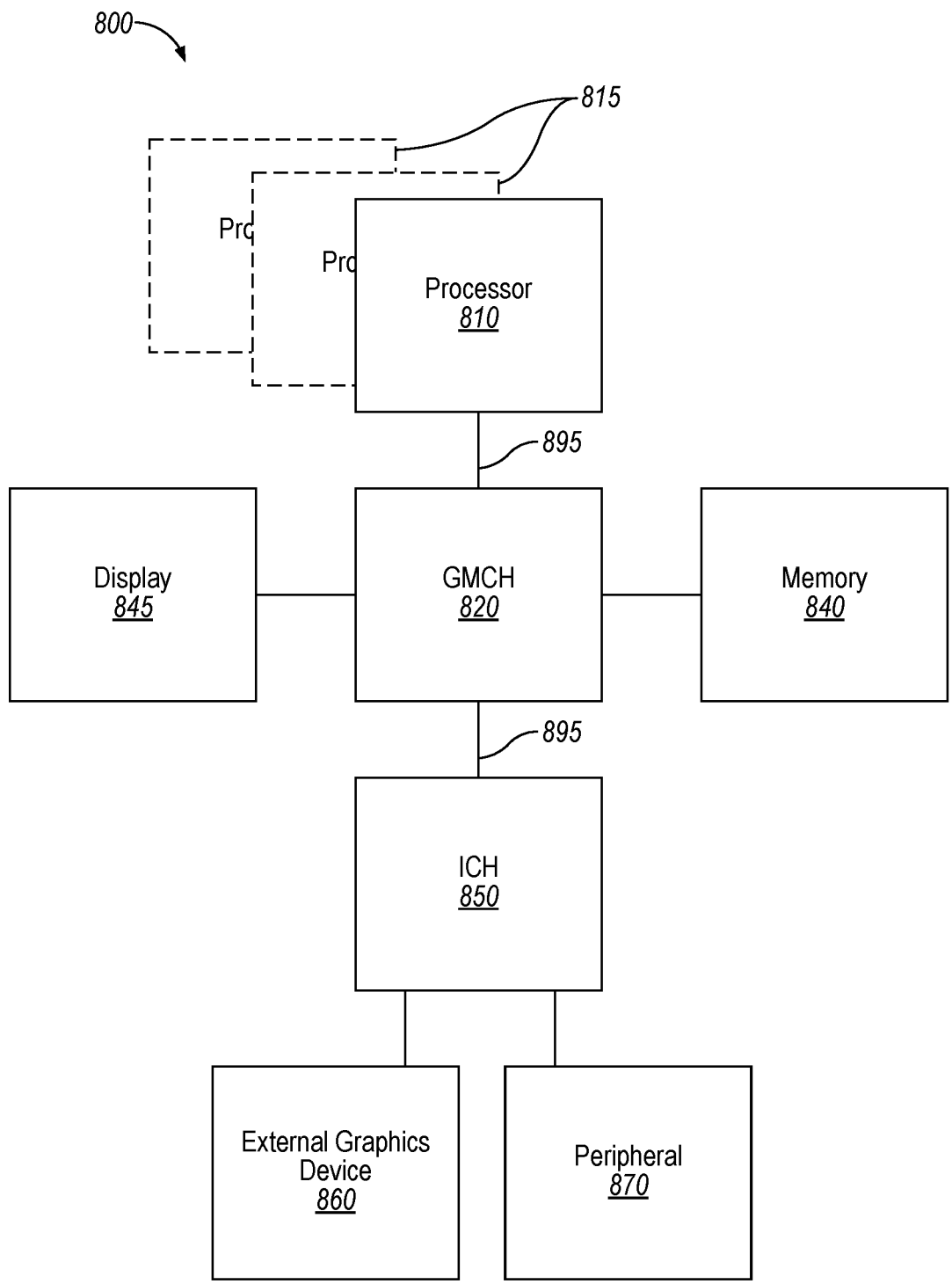
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
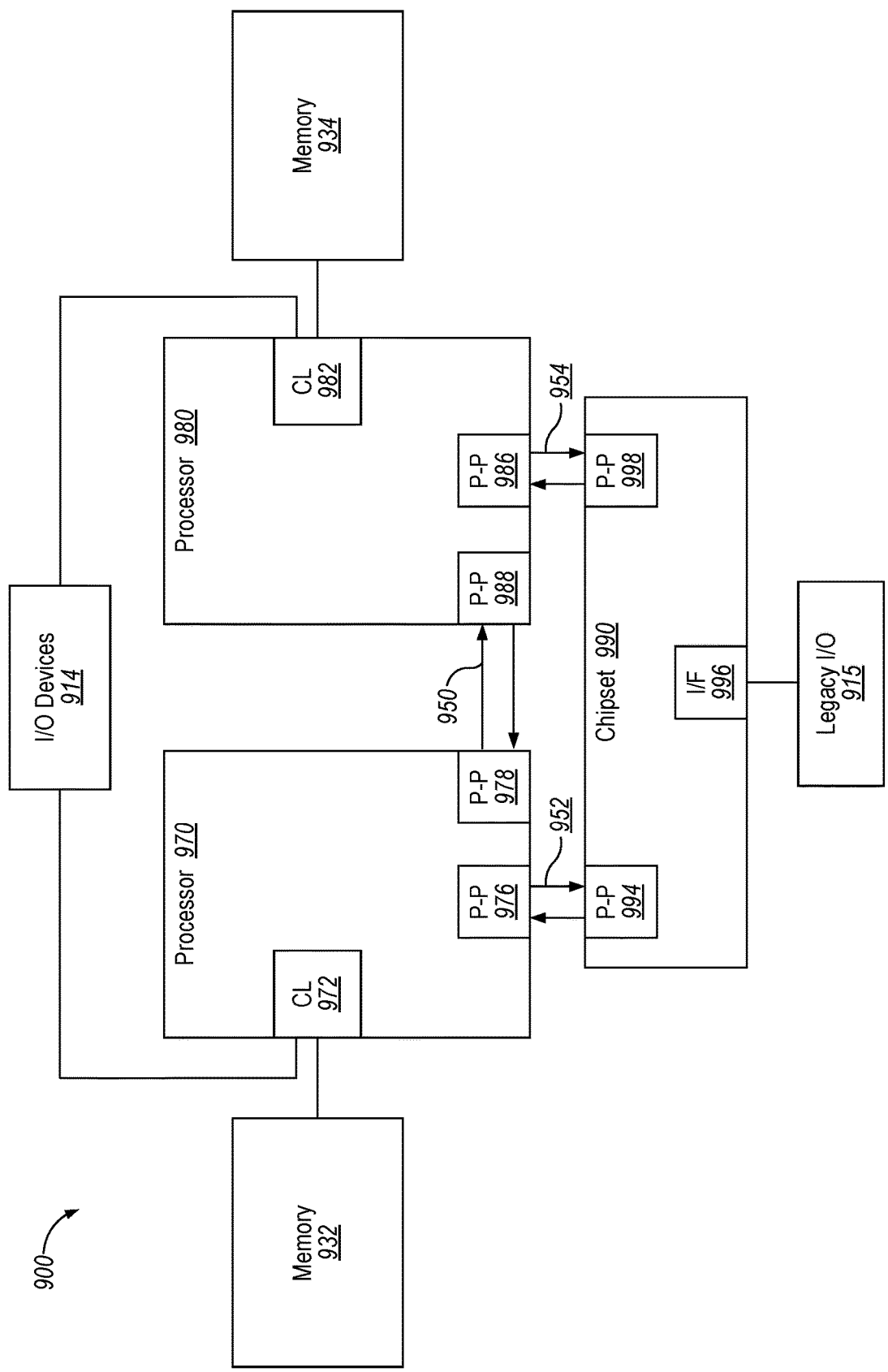
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
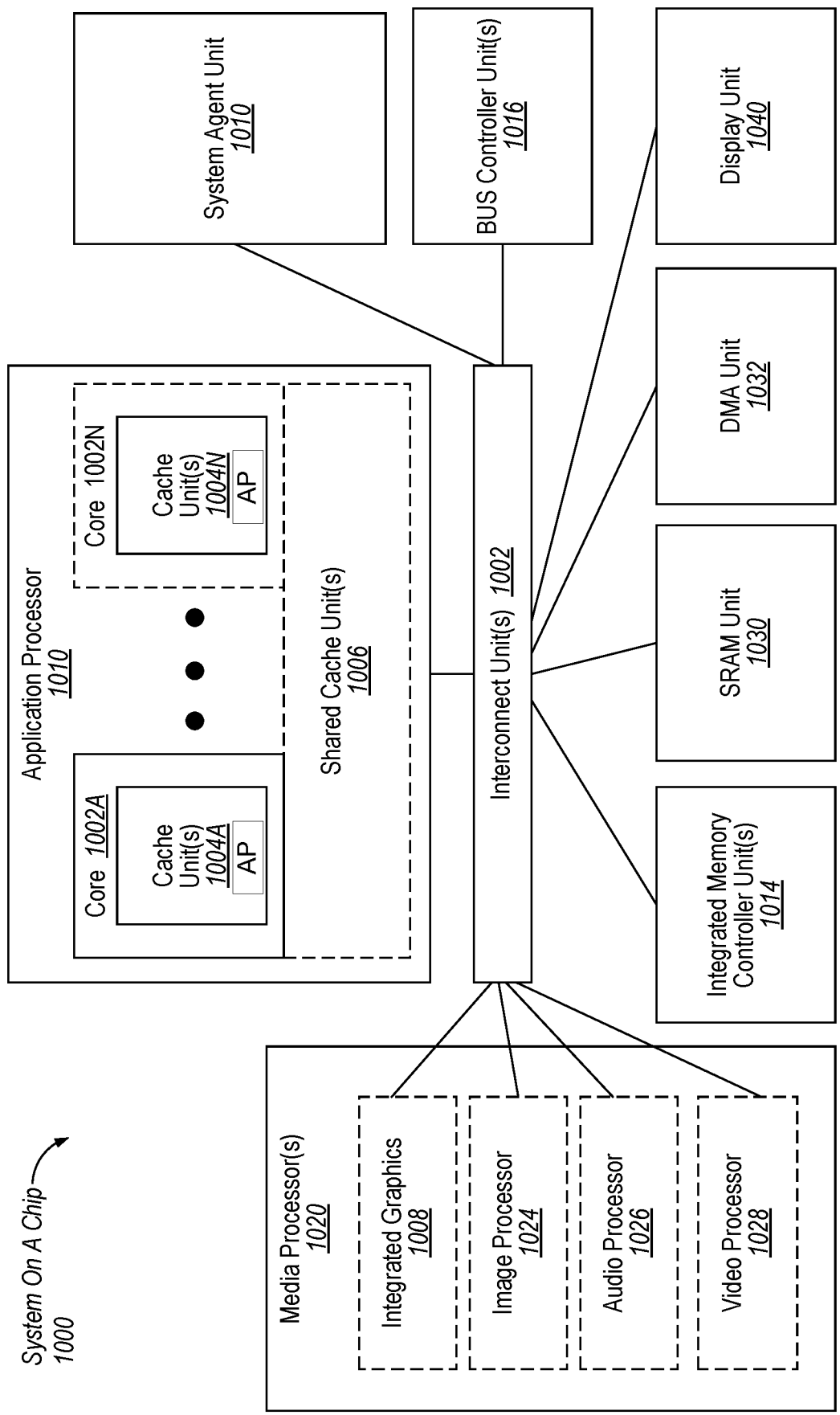
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
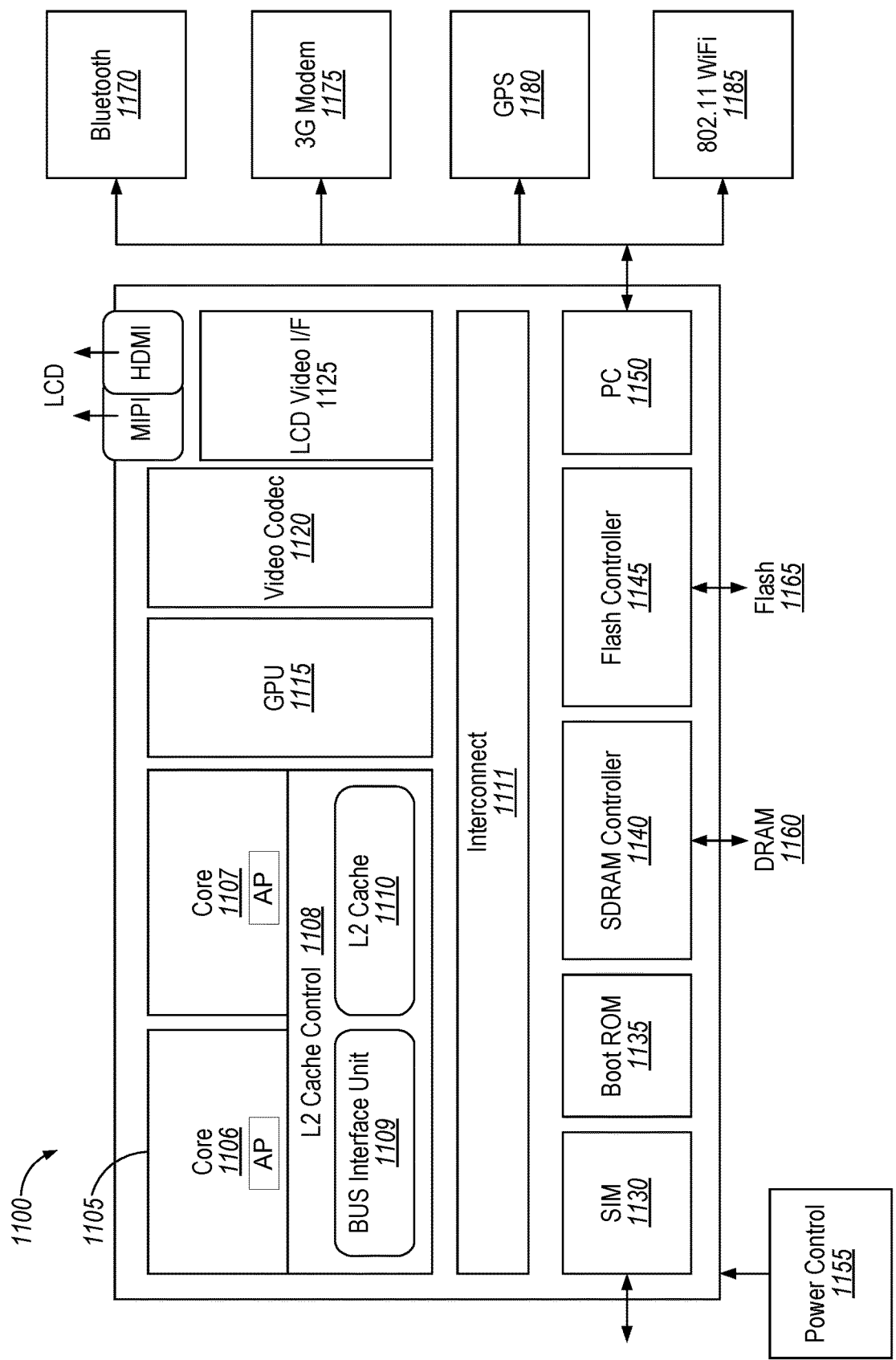
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
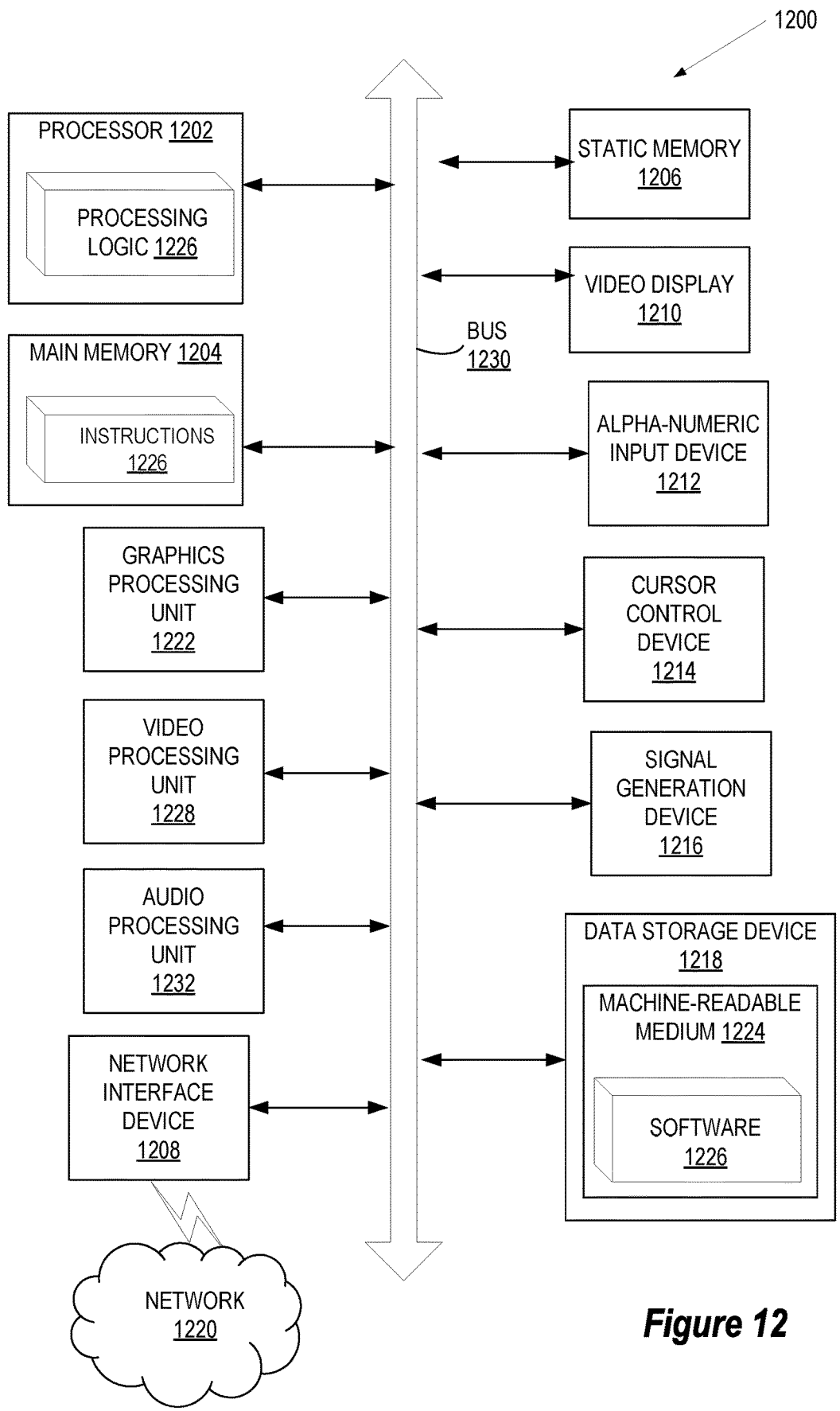
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor 102 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a system comprising an accelerator circuit comprising an accelerator function unit to implement a first function, and one or more device feature header (DFH)

circuits to provide attributes associated with the accelerator function unit, and a processor to retrieve the attributes of the accelerator function unit by traversing a device feature list (DFL) referencing the one or more DFH circuits, execute, based on the attributes, an application encoding the first function to cause the accelerator function unit to perform the first function.

In Example 2, the subject matter of Example 1 can further provide that the one or more DFH circuits comprise an identifier field for storing an identifier of a first logic circuit associated with the accelerator function unit, and a pointer field for storing a reference to a next DFH circuit on the DFL.

In Example 3, the subject matter of any of Examples 1 and 2 can further provide that at least one of the one or more DFH circuits further comprises a type field for providing a type value associated with the first logic circuit, and wherein the type value is one of an accelerator function unit type indicating that the first logic circuit is specific to the accelerator function unit, a basic building block type indicating the first logic circuit is usable by a plurality of accelerator function units, or a private feature type indicating a function within the accelerator function unit.

In Example 4, the subject matter of any of Examples 1 and 2 can further provide that at least one of the one or more DFH circuits further comprises a privilege field for storing a privilege level associated with the application, wherein the privilege level is one of a supervisor privilege or a user privilege.

In Example 5, the subject matter of any of Examples 1 and 2 can further provide that at least one of the one or more DFH circuits further comprises an access flag field for storing an access right of a memory region associated with the application, wherein the access right is one of an exclusive right to the application or a shared right with another application.

In Example 6, the subject matter of any of Examples 1 and 2 can further provide that at least one of the one or more DFH circuits further comprises a resource field for storing a resource parameter associated with a resource used by the application.

In Example 7, the subject matter of any of Examples 1 and 2 can further provide that the identifier is a global unique identifier that is uniquely associated with the first logic circuit.

In Example 8, the subject matter of any of Examples 1 and 2 can further provide that the reference is one of an address pointer or an address offset.

In Example 9, the subject matter of any of Examples 1 and 2 can further provide that at least one of the one or more DFH circuits comprises one or more additional pointer fields for storing additional references to additional DFH circuits.

In Example 10, the subject matter of Example 1 can further provide that the accelerator circuit is one of a field-programmable gated array (FPGA) circuit, an application-specific integrated circuit (ASIC), a general-purpose computing on graphics processing unit (GPGPU), a general-purpose accelerator (GPA), or a general-purpose processor.

In Example 11, the subject matter of Example 1 can further provide that the one or more DFH circuits comprise at least one of an array of registers, a memory-mapped input/output (MMIO) region, a peripheral component interconnect express (PCIe) configuration region, or a memory region.

In Example 12, the subject matter of Example 1 can further provide that a reference to a head of the DFL is stored in a pre-determined location accessible by the processor executing a DFL loader implemented as a component of a software application, and wherein the DFL references to one of a linked list of the one or more DFH circuits, a tree of the one or more DFH circuits, or a graph of the one or more DFH circuits.

Example 13 is an accelerator circuit comprising an accelerator function unit to implement a first function encoded in an application executed on a processor associated with the accelerator circuit, and one or more device feature header (DFH) circuits to provide attributes associated with the accelerator function unit, wherein the DFH circuits are linked to form a device feature list (DFL), wherein each of the DFH circuits of the DFL comprises an identifier field for storing an identifier associated with a first logic circuit associated with the accelerator function unit, and a pointer field for storing a reference to a next DFH circuit on the DFL.

In Example 14, the subject matter of Example 13 can further provide that at least one of the one or more DFH circuits comprises at least one of a type field for storing a type value associated with the first logic circuit, a privilege field for storing a privilege level associated with the application, wherein the privilege level is one of a supervisor privilege or a user privilege, an access flag field for storing an access right of a memory region associated with the application, wherein the access right is one of an exclusive right to the application or a shared right with another application, or a resource field for storing a resource parameter associated with a resource used by the application.

In Example 15, the subject matter of any of Examples 13 and 14 can further provide that the identifier is a global unique identifier that is uniquely associated with the first logic circuit, and wherein the type value is one of an accelerator function unit type indicating that the first logic circuit is specific to the accelerator function unit, a basic building block type indicating the first logic circuit is usable by a plurality of accelerator function units, or a private feature type indicating a function within the accelerator function unit.

In Example 16, the subject matter of Example 13 can further provide that the accelerator circuit is one of a field-programmable gated array (FPGA) circuit, an application-specific integrated circuit (ASIC), a general-purpose computing on graphics processing unit (GPGPU), a general-purpose accelerator (GPA), or a general-purpose processor.

In Example 17, the subject matter of Example 13 can further provide that the one or more DFH circuits comprise at least one of an array of registers, a memory-mapped input/output (MMIO) region, a peripheral component interconnect express (PCIe) configuration region, or a memory region.

In Example 18, the subject matter of Example 13 can further provide that the accelerator circuit is connected to a processor to retrieve the attributes of the accelerator function unit by traversing the DFL referencing the one or more DFH circuits, and execute, based on the attributes, an application encoding the first function to cause the accelerator function unit to perform the first function.

Example 19 is a method comprising identifying, based on a reference to a device feature list (DFL), a first device feature header (DFH) circuit comprising fields for storing an identifier and a next DFH pointer, identifying, based on the identifier, a function of an application, identifying, based on the next DFH pointer, a second DFH circuit, retrieving, from the second DFH circuit, an attribute associated with executing the function of the application, and executing the application to cause an accelerator function unit to perform the first function.

In Example 20, the subject matter of Example 19 can further provide that the accelerator function unit is part of an accelerator circuit coupled to a processor executing the application.

Example 21 is an apparatus comprising: means for performing the method of any of Examples 19 to 20.

Example 22 is a machine-readable non-transitory medium having stored thereon program code that, when executed, perform operations comprising identifying, based on a reference to a device feature list (DFL), a first device feature header (DFH) circuit comprising fields for storing an identifier and a next DFH pointer, identifying, based on the identifier, a function of an application, identifying, based on the next DFH pointer, a second DFH circuit, retrieving, from the second DFH circuit, an attribute associated with executing the function of the application, and executing the application to cause an accelerator function unit to perform the first function.

In Example 23, the subject matter of Example 22 can further provide that the accelerator function unit is part of an accelerator circuit coupled to a processor executing the application.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a microcontroller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   function unit circuitry to implement at least a first function; and
   one or more device feature header (DFH) registers to store attributes associated with the function unit circuitry,
   wherein a DFH register is to at least store:
     an identifier associated with the function unit circuitry,
     a type description of the function unit circuitry,
     an indication of a location of a next DFH register, and
     a size of a corresponding memory-mapped input/output (MMIO) region.

2. The apparatus of claim 1, wherein a type of the function unit circuitry is one or more of: accelerator function unit, basic building block, or private feature.

3. The apparatus of claim 2, wherein a private feature is a feature within an accelerator function unit.

4. The apparatus of claim 2, wherein a basic building block is a feature usable by a plurality of accelerator function units.

5. The apparatus of claim 1, wherein the function unit circuitry is to be programmed into a field programmable gate array (FPGA).

6. The apparatus of claim 1, further comprising a processor core coupled to the function unit circuitry and one or more DFH registers.

\* \* \* \* \*